(12) United States Patent
Fujii

(10) Patent No.: US 7,264,256 B2
(45) Date of Patent: Sep. 4, 2007

(54) BRACKET ASSEMBLY FOR A MOTOR CONTROLLED BICYCLE TRANSMISSION

(75) Inventor: Kazuhiro Fujii, Kawachinagano (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 841 days.

(21) Appl. No.: 09/766,696

(22) Filed: Jan. 19, 2001

(65) Prior Publication Data

US 2001/0046916 A1    Nov. 29, 2001

(51) Int. Cl.
*B62M 1/02* (2006.01)
*F16H 9/00* (2006.01)

(52) U.S. Cl. ........................................ 280/261; 474/80

(58) Field of Classification Search ............. 280/288.4, 280/260, 261; 180/205, 206, 207; 474/110, 474/144, 80, 81; 248/200, 230.1, 230.6; 224/419, 424–427, 428, 447, 448, 452, 454, 224/546, 924

See application file for complete search history.

(56) References Cited

U.S. PATENT DOCUMENTS

| | | | |
|---|---|---|---|
| 2,536,570 A * | 1/1951 | Rehn | |
| 2,704,626 A * | 3/1955 | Meier | |
| 2,944,712 A * | 7/1960 | Glenny | |
| 3,830,521 A * | 8/1974 | Gardel et al. ................ | 280/236 |
| 3,966,007 A * | 6/1976 | Havener et al. .............. | 180/34 |
| 4,023,424 A * | 5/1977 | Ryan et al. ................... | 474/80 |
| 4,044,852 A * | 8/1977 | Lewis et al. ................ | 180/68.5 |
| 4,065,983 A * | 1/1978 | Mimura ........................ | 74/625 |
| 4,085,814 A * | 4/1978 | Davidson et al. ............ | 180/65.1 |
| 4,143,557 A * | 3/1979 | Wakebe et al. ............. | 280/236 |
| 4,143,730 A * | 3/1979 | Desmond ..................... | 180/74 |
| 4,267,898 A * | 5/1981 | Wheaton ..................... | 180/205 |
| 4,490,127 A | 12/1984 | Matsumoto et al. ........ | 474/110 |
| 4,599,079 A * | 7/1986 | Chappell ..................... | 474/80 |
| 4,693,700 A * | 9/1987 | Chappell ..................... | 474/80 |
| 5,152,720 A * | 10/1992 | Browning et al. ............ | 474/80 |
| 5,199,929 A * | 4/1993 | Stites .......................... | 474/54 |
| 5,213,549 A * | 5/1993 | Blanchard ..................... | 474/81 |
| 5,390,946 A * | 2/1995 | Spicer ........................ | 280/259 |
| 5,470,277 A | 11/1995 | Romano ...................... | 474/70 |
| 5,483,137 A * | 1/1996 | Fey et al. ................... | 318/560 |
| 5,538,477 A * | 7/1996 | Bellio et al. ................. | 474/70 |
| 5,551,315 A * | 9/1996 | Pikoulas .................... | 74/502.2 |

(Continued)

FOREIGN PATENT DOCUMENTS

EP         529664 A2      3/1993

(Continued)

OTHER PUBLICATIONS

Marukin "Magic Gear" advertisement, published prior to Feb. 9, 2000.

(Continued)

*Primary Examiner*—Anne Marie Boehler
(74) *Attorney, Agent, or Firm*—James A. Deland

(57) ABSTRACT

A bracket assembly for mounting a motor or other control device to a bicycle frame includes a bracket base for supporting the control device at least partially above a chain stay, and a bracket support extending from the bracket base for coupling the bracket base to at least one of a chain stay, a seat stay, a seat tube, or a bottom bracket shell.

82 Claims, 15 Drawing Sheets

U.S. PATENT DOCUMENTS

| | | | | |
|---|---|---|---|---|
| 5,605,514 A | * | 2/1997 | Driver | 474/70 |
| 5,653,649 A | | 8/1997 | Watarai | 474/78 |
| 5,681,234 A | * | 10/1997 | Ethington | 474/70 |
| 5,803,848 A | | 9/1998 | Nier | 474/81 |
| 6,024,186 A | * | 2/2000 | Suga | 180/291 |
| 6,057,657 A | * | 5/2000 | Kitamura | 318/16 |
| 6,142,899 A | * | 11/2000 | Liu et al. | 474/80 |
| 6,244,415 B1 | * | 6/2001 | Fujii | 192/217 |

FOREIGN PATENT DOCUMENTS

| | | | |
|---|---|---|---|
| JP | 5-44783 | | 6/1993 |
| JP | 6-48368 | | 2/1994 |
| JP | 10-159964 | | 6/1998 |
| WO | WO93/11992 | * | 6/1993 |

OTHER PUBLICATIONS

Shimano "Auto-D" Installation Conditions, published prior to Feb. 9, 2000.

* cited by examiner

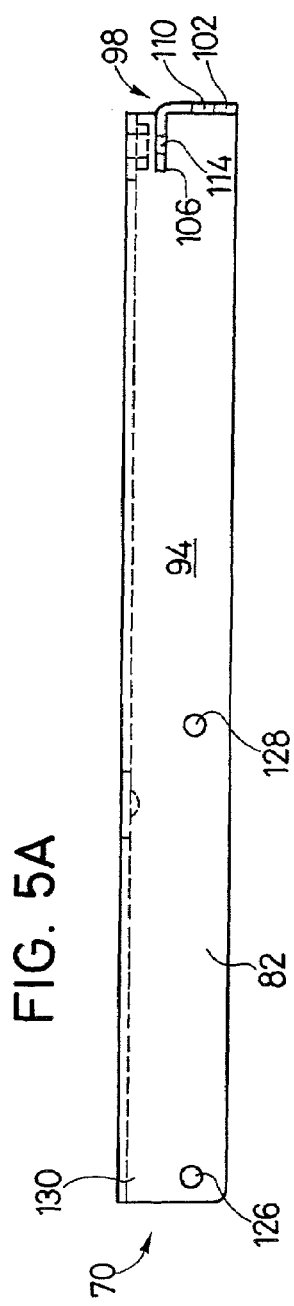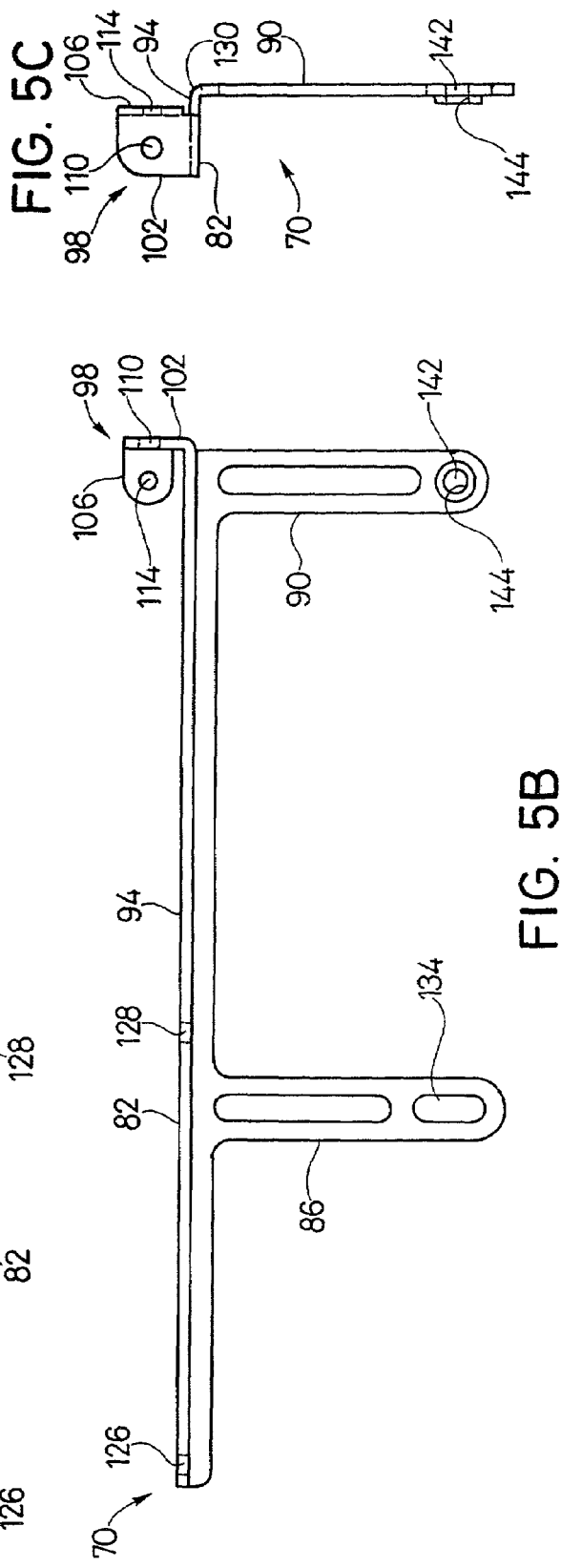

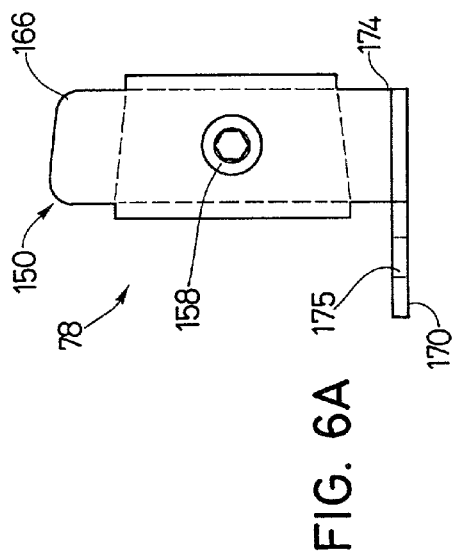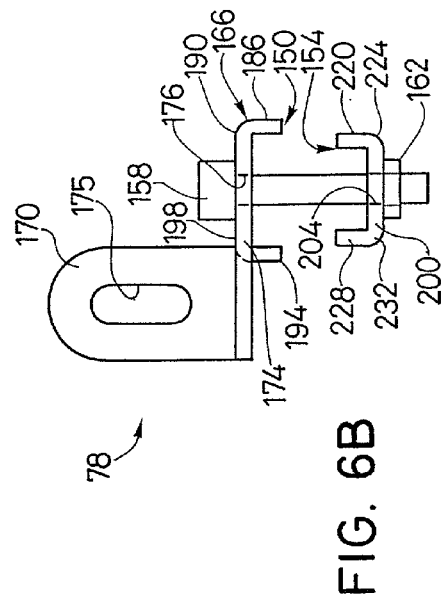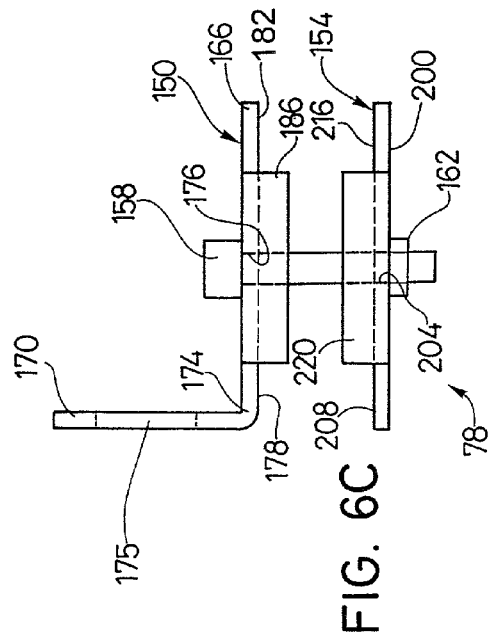

BRACKET ASSEMBLY FOR A MOTOR CONTROLLED BICYCLE TRANSMISSION

BACKGROUND OF THE INVENTION

The present invention is directed to control devices for bicycles and, more particularly, to a bracket assembly used to support a motor for controlling a bicycle transmission.

Motor controlled bicycle transmissions sometimes use a motor connected to an elongated control cable which, in turn, is connected to the bicycle transmission. The motor operates the bicycle transmission by selectively pulling and releasing the control cable. One of the design considerations of such motor controlled bicycle transmissions is how and where to mount the motor to the bicycle. Mounting the motor directly to the bicycle frame can be difficult because the motor often interferes with other bicycle components such as the wheels, sprockets, drive chain, brakes, and other structures mounted to the bicycle frame itself. The problem may be compounded by the shape of the frame, which may be curved or angled in such a way as to make mounting of the motor difficult. To avoid such problems, it has been proposed to mount the motor on the side of the bicycle frame. However, with such a design the laterally projecting motor may interfere with the motion of the rider. Also, the motor may be damaged by passing objects or if the bicycle falls over. In some cases a specially designed frame can be made to accommodate the motor, but that increases the cost of the bicycle. Also, the motor used with the special frame can not be transferred to another frame without difficulty, and a motor from a different frame can not be used with the special frame.

SUMMARY OF THE INVENTION

The present invention is directed to a bracket assembly for mounting a motor and/or other control device for a bicycle to the bicycle frame. The bracket assembly allows the motor or other control device to be mounted to the bicycle so as to accommodate different frame sizes and configurations without requiring a specially designed frame and without interfering with other components mounted to the bicycle frame. Also, the motor or other control device may be mounted without projecting laterally in a manner that causes interference with the rider's movements and without creating a risk of damage to the motor if the bicycle falls over.

In one embodiment of the present invention, a bracket assembly according to the present invention for mounting a motor or other control device to a bicycle frame includes a bracket base for supporting the control device at least partially above a chain stay, and a bracket support extending from the bracket base for coupling the bracket base to at least one of a chain stay, a seat stay, a seat tube, or a bottom bracket shell.

In another embodiment of the present invention, a bracket assembly according to the present invention for mounting a motor or other control device to a bicycle frame includes a bracket base for supporting the control device at least partially above a chain stay, a first bracket support for attachment to at least one of a chain stay and a seat stay, and a second bracket support for attachment to at least one of a chain stay, a seat tube and a bottom bracket shell. This allows the motor to be mounted in a space defined by the seat tube, the chain stay tubes and the seat stay tubes of the bicycle frame in a compact and unobtrusive manner.

The bracket assembly can take many forms. For example, the bracket base may be oriented in a number of ways to suit the application. The bracket supports can be coupled to one or more chain stays and/or seat stays, one bracket support can be coupled to a chain stay and another bracket support can be coupled to a bottom bracket shell, one bracket support can be coupled to a chain stay and another bracket support can be coupled to a seat tube, one bracket support can be coupled to a chain stay and another bracket support can be coupled to a seat stay, and so on.

BRIEF DESCRIPTION OF THE DRAWINGS

FIGS. 5A-5C are top, side and front views, respectively, of the main bracket;

FIGS. 6A-6C are top, side and front views of a bracket support bridge used to attach the bracket assembly to the chain stays of the bicycle frame;

DETAILED DESCRIPTION OF THE EMBODIMENTS

Figure 1:
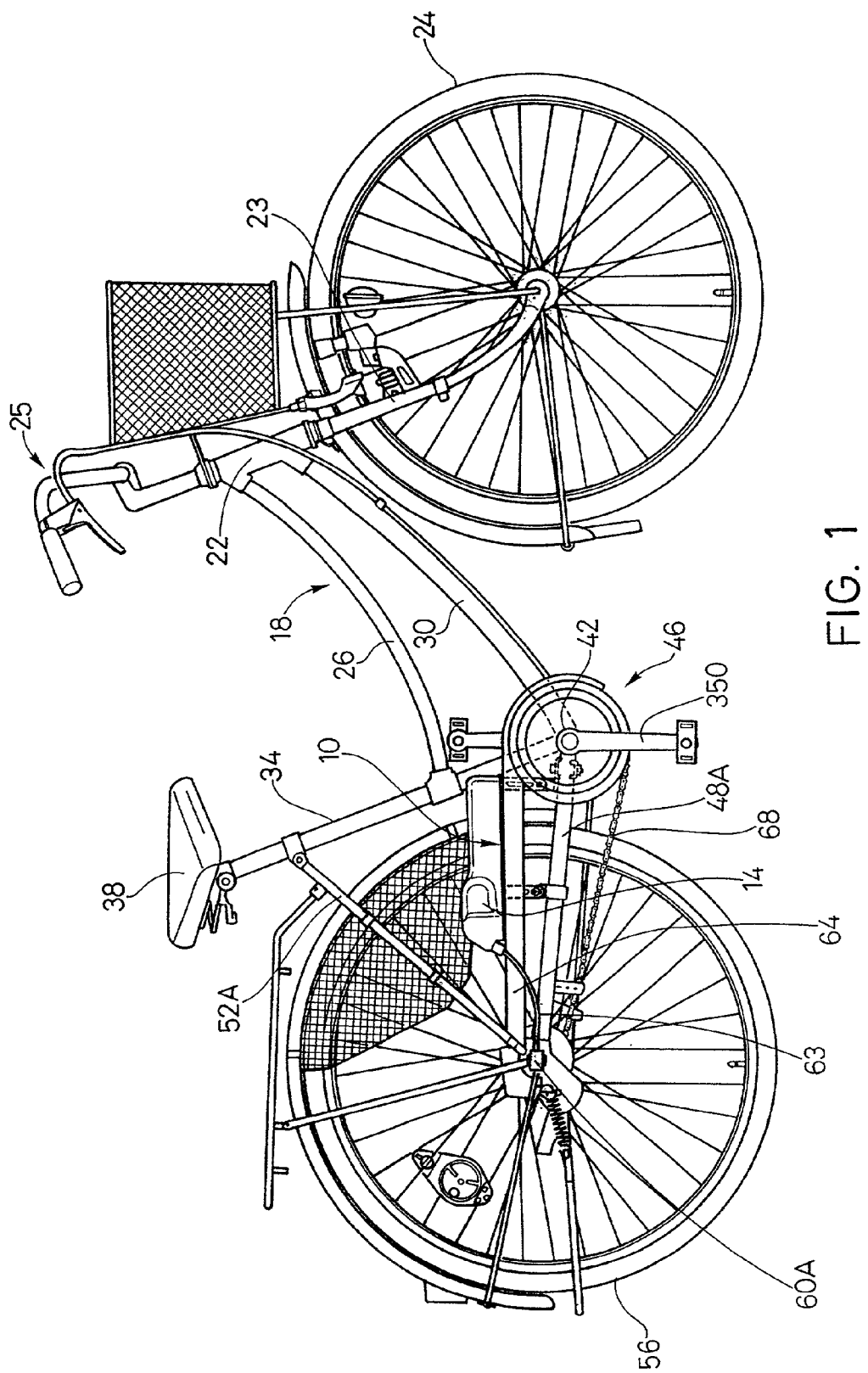
FIG. 1 is a side view of a bicycle that incorporates a particular embodiment of a bracket assembly according to the present invention for mounting a control device such as a motor to the bicycle frame.

FIG. 1 is a side view of a bicycle that incorporates a particular embodiment of a bracket assembly 10 according to the present invention for mounting a control device such as a motor 14 to a bicycle frame 18. In this embodiment, the bicycle frame 18 is a conventional double-loop style frame comprising a head tube 22 rotatably supporting a front fork 23, a front wheel 24 and a handlebar assembly 25; a top tube 26 extending rearwardly from the head tube 22; a down tube 30 extending rearwardly from the head tube 22 below the top tube 26; a seat tube 34 supporting a saddle 38; a bottom bracket shell 42 connected between the down tube 30 and the seat tube 34 for rotatably supporting a crank set 46, generally parallel first and second chain stays 48A and 48B (FIG. 3) extending rearwardly from bottom bracket shell 42, and generally parallel first and second seat stays (only seat stay 52A is shown) extending rearwardly and downwardly from seat tube 34. A rear wheel 56 supported by an internal hub transmission 58 (FIG. 3) is rotatably mounted to generally parallel rear dropouts 60A and 60B (FIG. 3) that connect the chain stays to the seat stays. For the purpose of this invention, the rear dropouts 60A and 60B can be considered part of both the chain stays and the seat stays. The internal hub transmission 58 is controlled by motor 14 through a control cable 63.

In general, bracket assembly 10 is mounted in a space defined by the seat tube 34, chain stay 48A and seat stay 52A to be visible above a chain case 64 which covers and protects an upper portion of a drive chain 68. The bracket assembly 10 allows the motor 14 to be mounted so that the motor 14 is disposed above the chain case 64, in this embodiment close to the seat tube 34, and portions of the bracket assembly 10 in this embodiment do not protrude laterally from the chain case 64.

Figure 2:
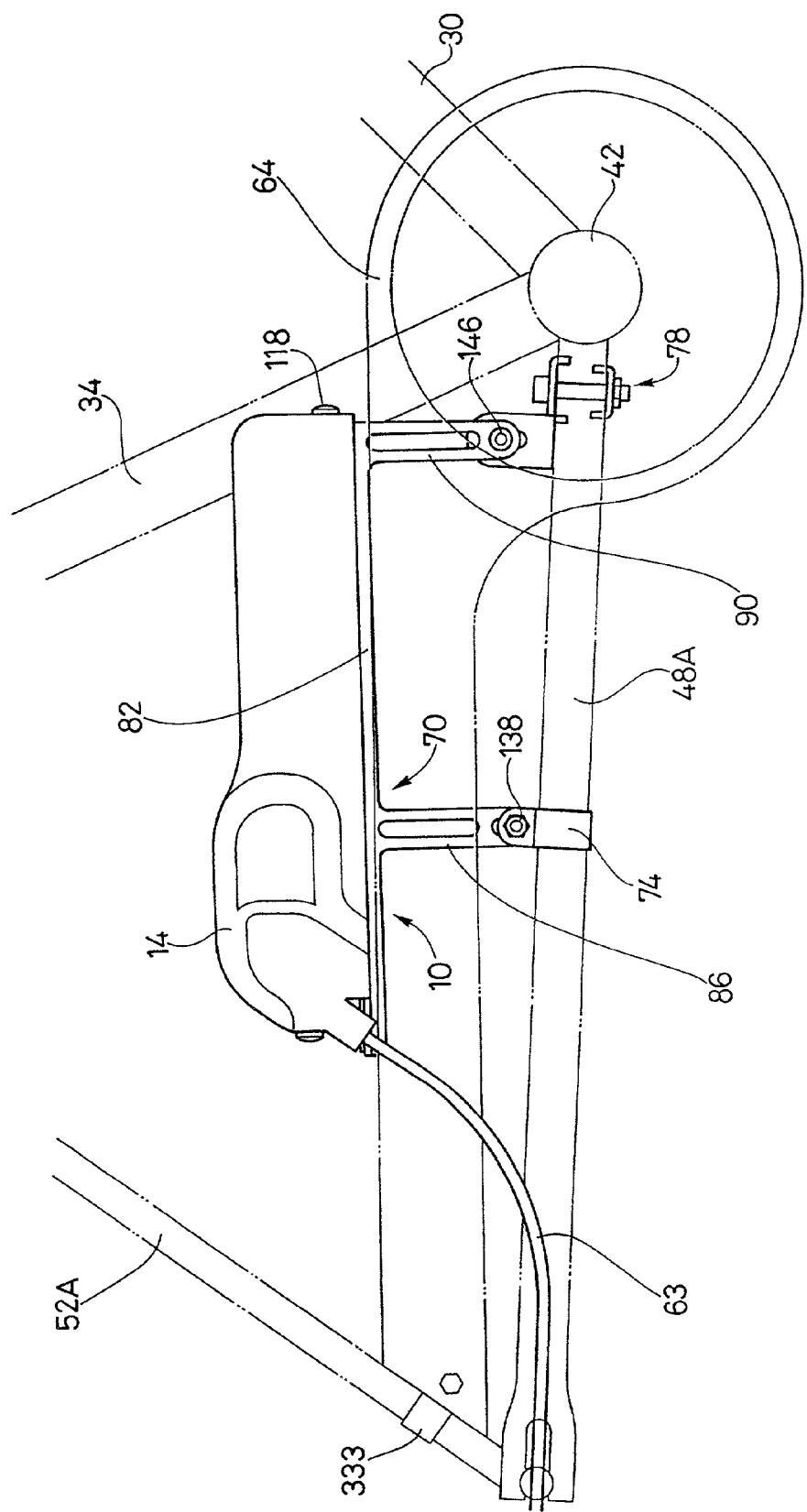
FIG. 2 is a more detailed view of the bracket assembly attached to the bicycle frame.
Figure 3:
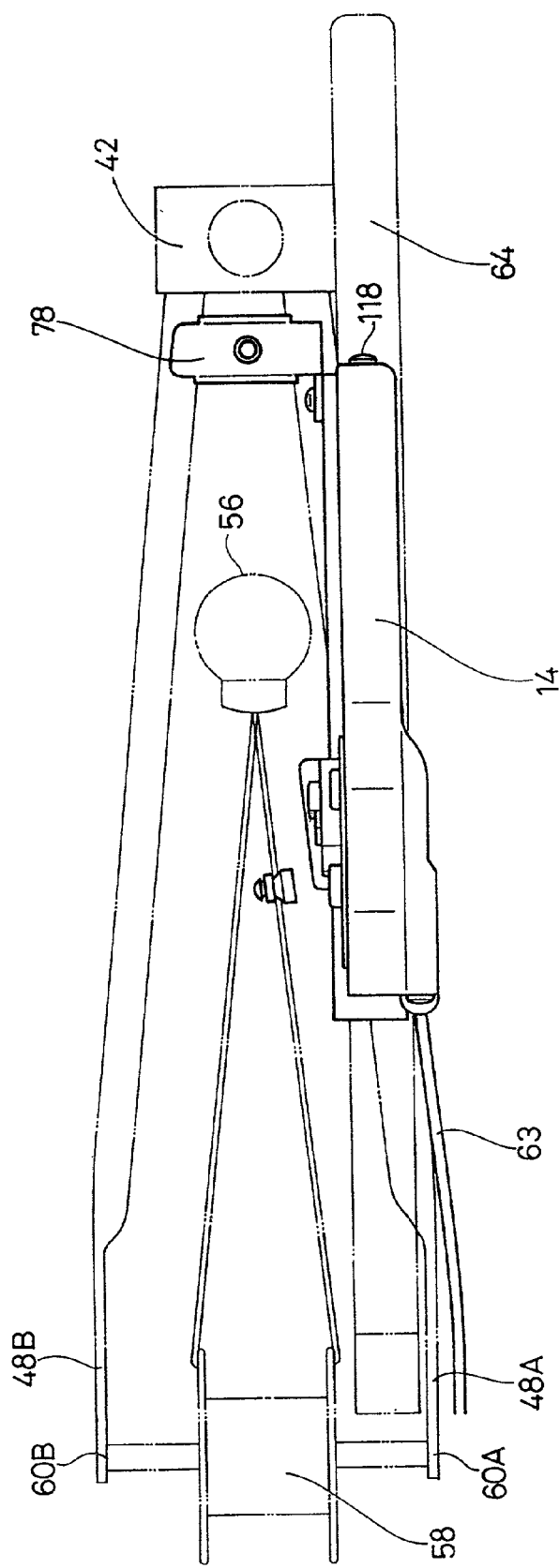
FIG. 3 is a top view of the bracket assembly shown in FIG. 2.
Figure 4:
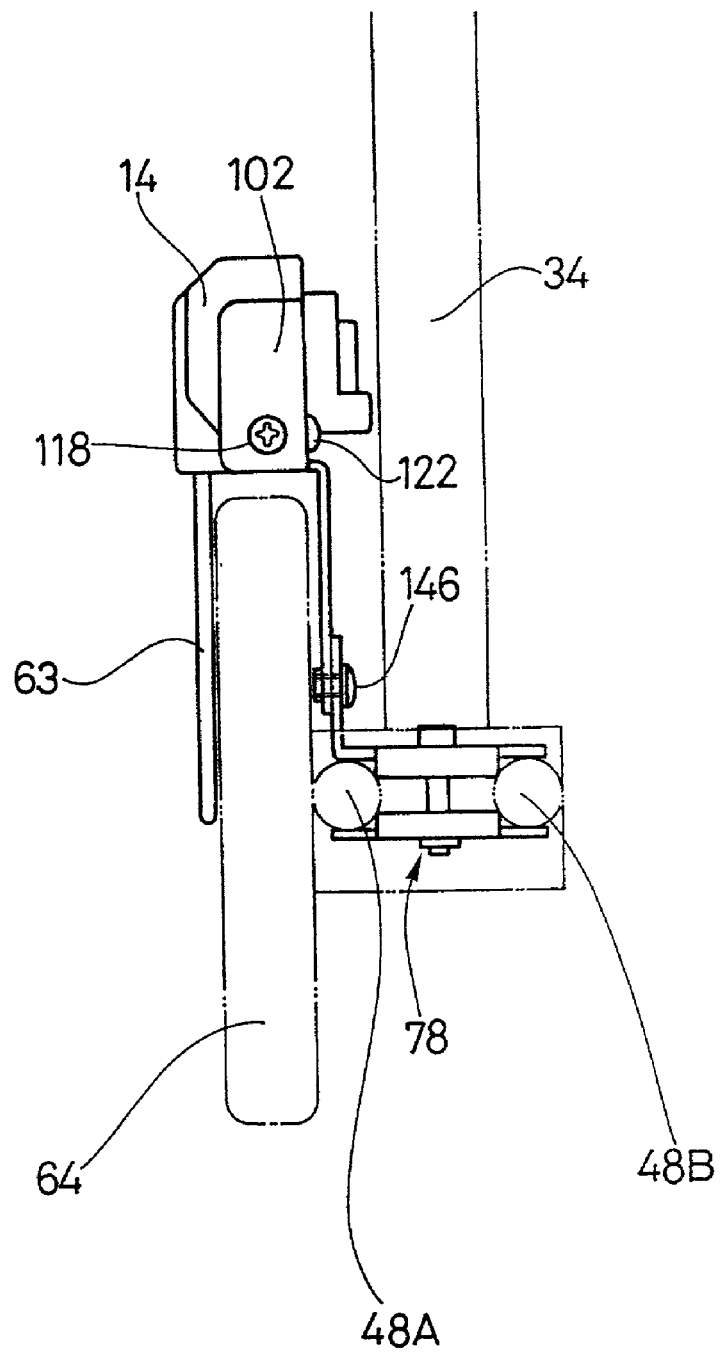
FIG. 4 is a front view of the bracket assembly shown in FIG. 2.

FIG. 2 is a detailed side view of the bracket assembly 10 shown in FIG. 1, FIG. 3 is a top view of bracket assembly 10, and FIG. 4 is a front view of bracket assembly 10. As shown in those Figures, bracket assembly 10 includes a main bracket 70 for supporting motor 14, a clamping band 74 for attaching main bracket 70 to chain stay 48A, and a bracket support bridge 78 for attaching main bracket 70 to chain stays 48A and 48B.

FIGS. 5A-5C are top, side and front views, respectively, of main bracket 70. As shown in those Figures, main bracket 70 includes a substantially horizontal bracket base 82 for supporting motor 14 at least partially above chain stay 48A and, more particularly, above chain case 64, a first bracket support 86 for coupling bracket base 82 to chain stay 48A, and a second bracket support 90 for coupling bracket base 82 to chain stay 48A through bracket support bridge 78. An upper surface 94 of bracket base 82 is substantially flat along substantially its entire length. A mounting flange 98 extends upwardly from upper surface 94 for mounting motor 14 to the front of bracket base 82. More specifically, mounting flange 98 includes a substantially planar first flange portion 102 extending generally perpendicularly upwardly from upper surface 94 at the front of bracket base 82, and a substantially planar second flange portion 106 extending generally perpendicularly rearwardly from an inner lateral side of first flange portion 102. First flange portion 102 and second flange portion 106 include mounting openings 110 and 114, respectively, for receiving mounting screws 118 and 122 (FIG. 4) for securing motor 14 to mounting flange 98. Similar mounting structures in the form of mounting holes 126 and 128 are disposed on upper surface 94 for receiving further mounting screws (not shown) for securing motor 14 to upper surface 94. Of course, mounting openings may be added or subtracted as desired, and other mounting structures such as posts, adhesives, etc. may be used instead of or in addition to the mounting structures shown.

In this embodiment, first bracket support 86 and second bracket support 90 are elongated members that extend substantially parallel to each other downwardly from a lateral side 130 of bracket base 82 when viewed from a front of bracket base 82 (as in FIG. 5C) and are substantially perpendicular to upper surface 94. First bracket support 86 and second bracket support 90 thus are laterally offset from a center of bracket base 82. Second bracket support 90 is disposed at a front of bracket base 82, and first bracket support 86 is disposed behind second bracket support 90. First bracket support 86 includes a vertically elongated mounting opening 134 for receiving a mounting screw 138 (FIG. 2) therethrough for coupling first bracket support 86 to clamping band 74. Second bracket support 90 includes a mounting opening 142 having a threaded inner peripheral surface 144 for receiving a mounting screw 146 (FIG. 2) therethrough for coupling second bracket support 90 to bracket support bridge 78. Of course, if desired bracket support bridge 78 could be omitted, and second bracket support 90 could be coupled to seat stay 48A through a clamping band similar to clamping band 74. The threaded inner peripheral surface 144 also is not necessary.

FIGS. 6A-6C are top, side and front views of bracket support bridge 78. In this embodiment, bracket support bridge 78 is adapted to bridge the first and second chain stays 48A and 48B as shown in FIG. 4 for coupling second bracket support 90 to the first and second chain stays 48A and 48B. Bracket support bridge 78 includes an upper clamping flange 150, a lower clamping flange 154, a clamping bolt 158 and a clamping nut 162. Bracket support bridge 78 is secured to seat stays 48A and 48B by placing bracket support bridge in the position shown in FIGS. 3 and 4 and tightening clamping bolt 158 and clamping nut 162. Upper clamping flange 150 includes a generally horizontal clamping plate 166 and a bracket support mounting wall 170 extending vertically upwardly, substantially perpendicular to a side edge 174 of clamping plate 166 and having a vertically elongated mounting hole 175 for receiving mounting screw 146 therethrough. Clamping plate 166 includes a mounting opening 176 for receiving clamping bolt 158 therethrough, a chain stay clamping surface 178 for contacting chain stay 48A, a chain stay clamping surface 182 for contacting chain stay 48B, a front reinforcing rib 186 extending generally perpendicularly downwardly from a front edge 190, and a rear reinforcing rib 194 extending generally perpendicularly downwardly from a rear edge 198.

Lower clamping flange 154 includes a generally horizontal clamping plate 200, wherein clamping plate 200 includes a mounting opening 204 for receiving clamping bolt 158 therethrough, a chain stay clamping surface 208 for contacting chain stay 48A, a chain stay clamping surface 216 for contacting chain stay 48B, a front reinforcing rib 220 extending generally perpendicularly upwardly from a front edge 224, and a rear reinforcing rib 228 extending generally perpendicularly upwardly from a rear edge 232.

Figure 7:
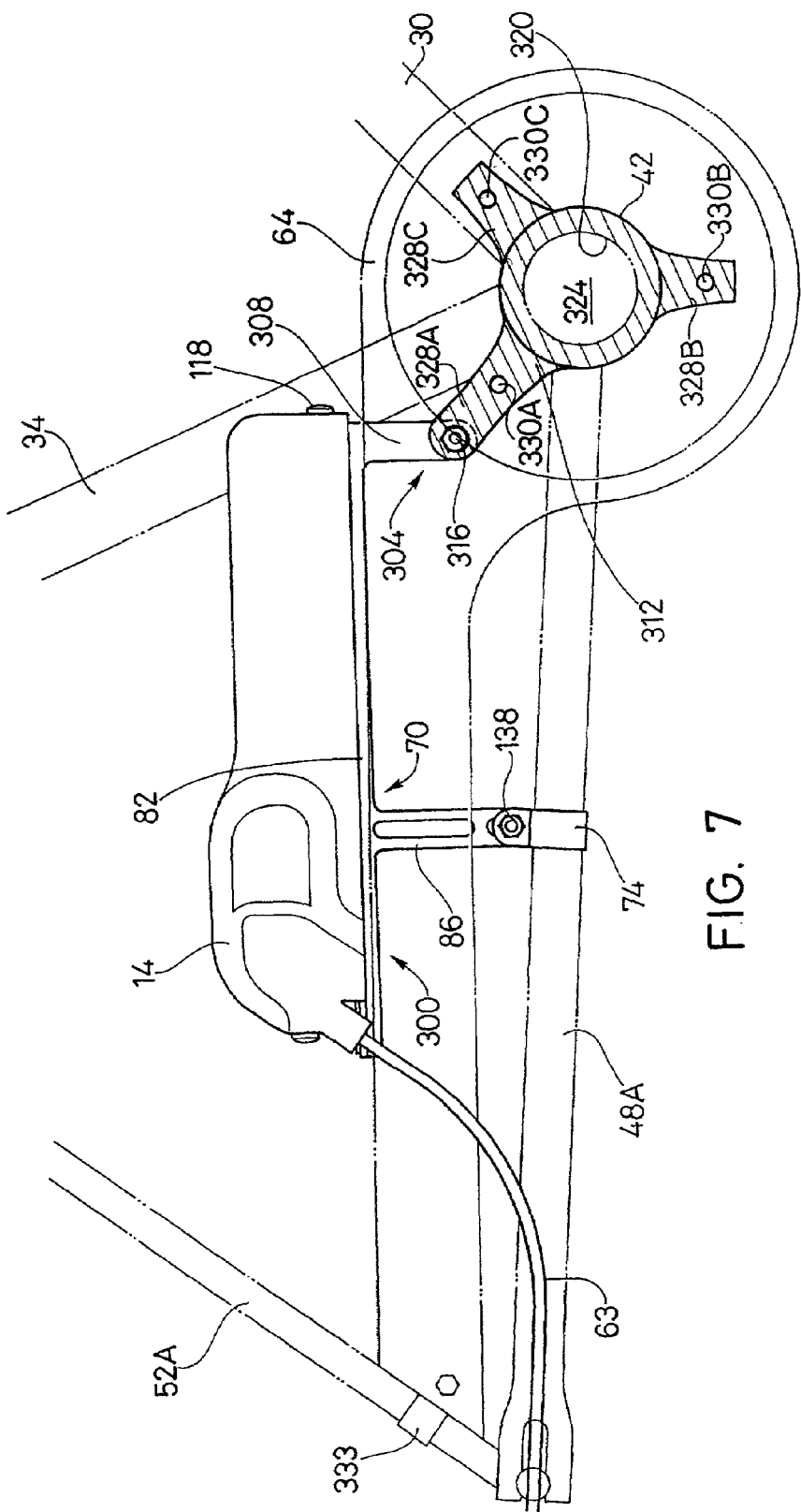
FIG. 7 is a side view of a second embodiment of a bracket assembly according to the present invention for mounting a control device such as a motor to the bicycle frame.

FIG. 7 is a side view of a second embodiment of a bracket assembly 300 according to the present invention for mounting a control device such as motor 14 to the bicycle frame 18. This embodiment has many features in common with the first embodiment, so the identical components are numbered the same, and only the differences will be described in detail.

In this embodiment, first bracket support 86 is adapted to couple bracket base 82 to first chain stay 48A as in the first embodiment, but a second bracket support 304 is adapted to couple bracket base 82 to bottom bracket shell 42. In this embodiment, second bracket support 304 includes a first bracket support portion 308 and a second bracket support portion 312. First bracket support portion 308 extends downwardly from the lateral side 130 of bracket base 82 when viewed from a front of bracket base 82 in the same manner as second bracket support 90 in the first embodiment. Second bracket support portion 312 is coupled to first bracket support portion 308 through a screw 316 and includes an opening 320 that aligns with an opening 324 (FIG. 8A) in bottom bracket shell 42. In this embodiment, opening 320 is circular, but that is not necessary. Also, in this embodiment second bracket support portion 312 includes mounting ears 328A, 328B and 328C that serve as chain case mounting structures for mounting chain case 64 to second bracket support portion 312 and hence to bottom bracket shell 42. For that purpose, mounting ears 328A, 328B and 328C include mounting ear openings 330A, 330B and 330C for receiving the mounting screws (not shown) used to fasten chain case 64 to second bracket support portion 312. Mounting ear 328A is fastened to first bracket support portion 308 through screw 316. A similar structure is used to fasten chain case 64 to bottom bracket shell 42 in the other embodiments, but in those embodiments mounting ear 328A ordinarily is not used to fasten chain case 64 to the second bracket support. In all embodiments the rear of chain case 64 ordinarily is mounted to seat stay 52A through a clamping band 333, but other arrangements are possible.

Figure 8A:
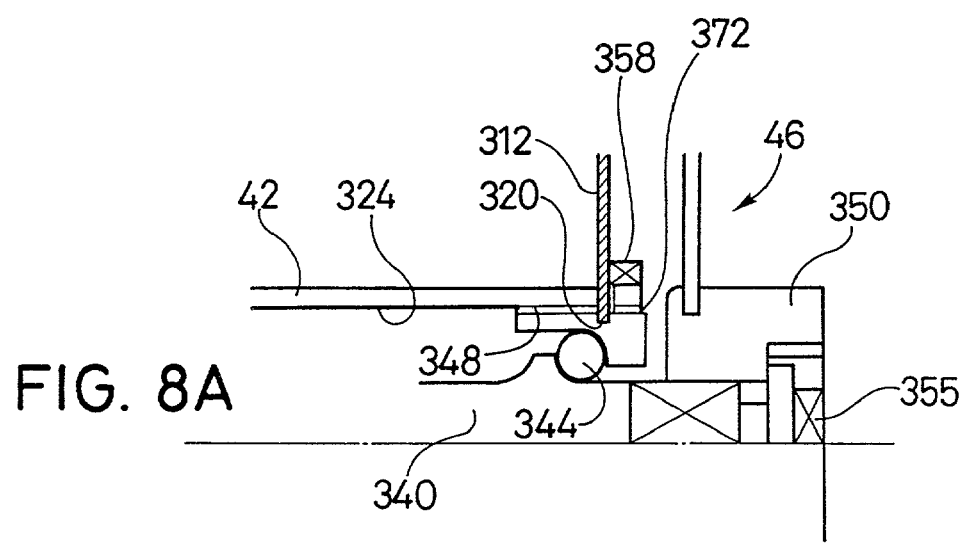
FIG. 8A is a detailed view showing how the bracket assembly of FIG. 7 is mounted to the bottom bracket shell.
Figure 8B:
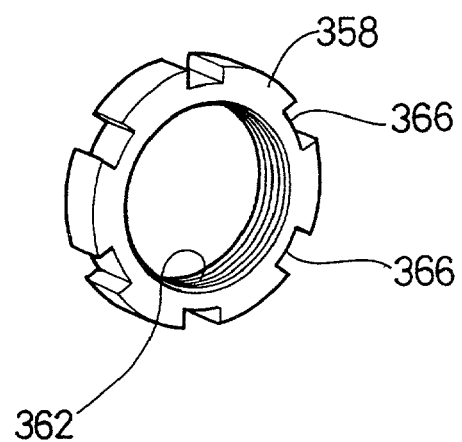
FIG. 8B is a perspective view of a fastening flange used to fasten the bracket assembly of FIG. 7 to the bottom bracket shell.

FIG. 8A is a detailed view showing how second bracket portion 312 is mounted to bottom bracket shell 42. Bottom bracket shell 42 rotatably supports a crank axle 340 through ball bearings 344 and a bearing race 348 that has a threaded outer peripheral surface 372 that is screwed into bottom bracket shell 42 in a conventional manner. Crank arm 350 of crank set 46 is mounted to crank axle 340 through a bolt 355 in a conventional manner. A mounting nut 358 (FIG. 8B) having a threaded inner peripheral surface 362 and a plurality of tool engaging grooves 366 on the outer peripheral surface thereof is screwed onto the threaded outer peripheral surface 372 of bearing race 348 for securing second bracket portion 312 to bottom bracket shell 42.

Figure 9:
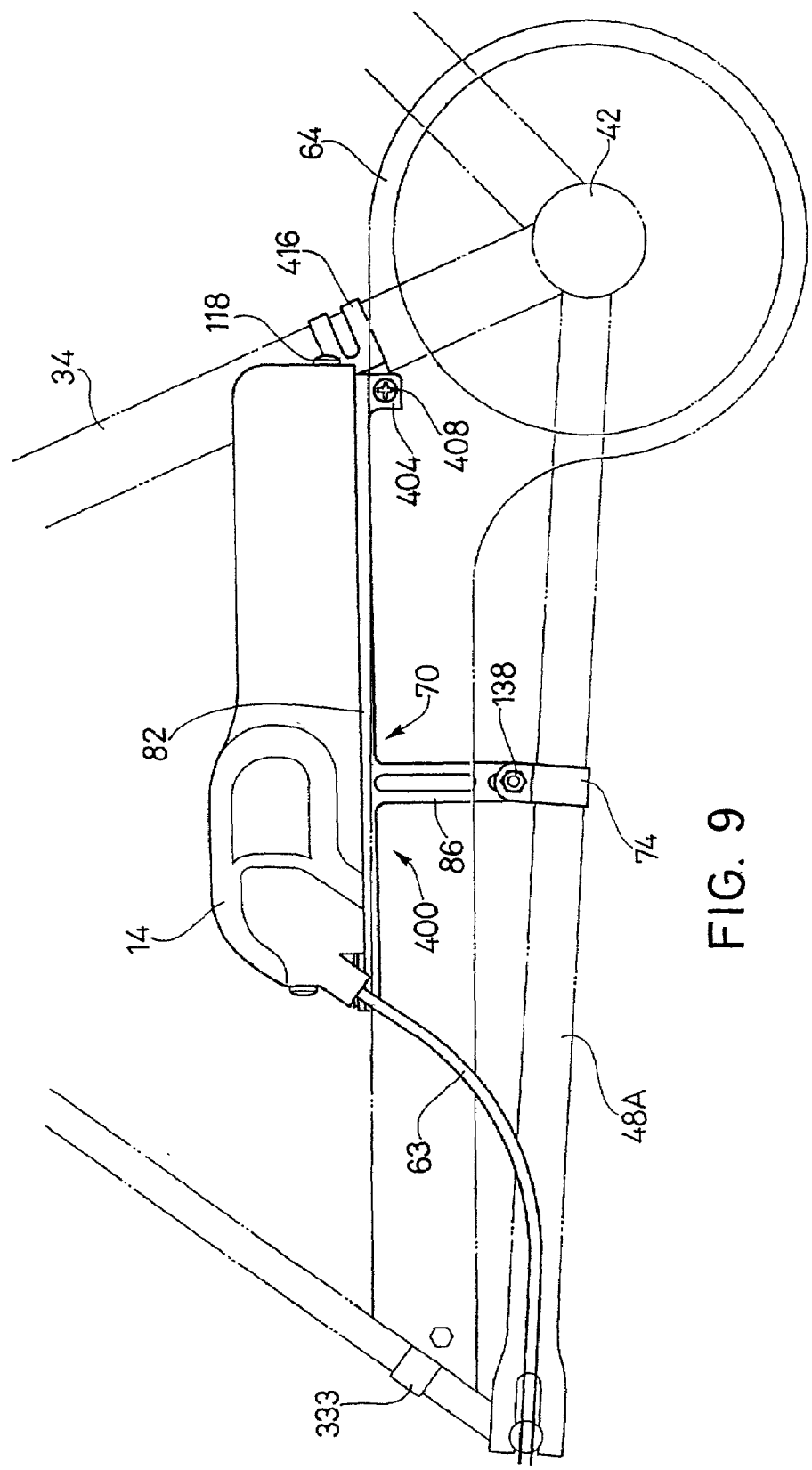
FIG. 9 is a side view of a third embodiment of a bracket assembly according to the present invention for mounting a control device such as a motor to the bicycle frame.

FIG. 9 is a side view of a third embodiment of a bracket assembly 400 according to the present invention for mounting a control device such as motor 14 to the bicycle frame 18. As with the second embodiment, this embodiment has many features in common with the first embodiment, so the identical components are numbered the same, and only the differences will be described in detail.

Figure 10:
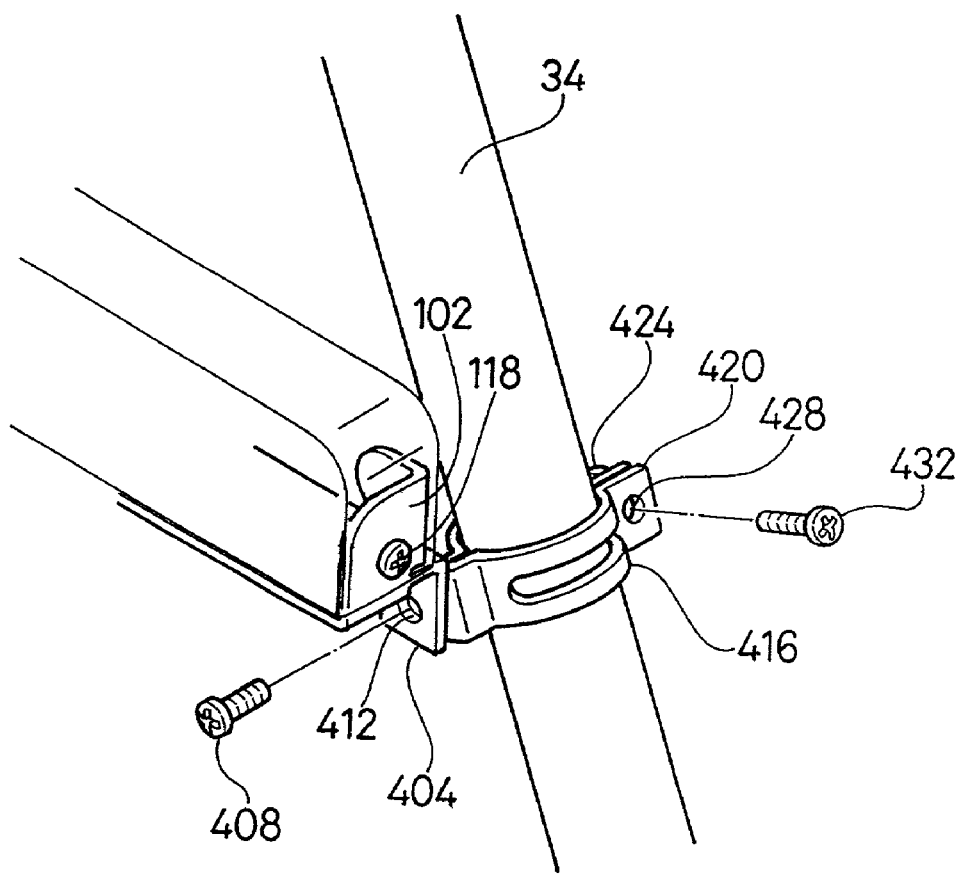
FIG. 10 is a detailed view showing how the bracket assembly is mounted to the seat tube.

In this embodiment, first bracket support 86 is adapted to couple bracket base 82 to first chain stay 48A in the same manner as in the first embodiment, and a second bracket support 404 is adapted to couple bracket base 82 to seat tube 34. As in the first embodiment, second bracket support 404 extends downwardly from the lateral side 130 of bracket base 82 when viewed from a front of bracket base 82. As shown in more detail in FIG. 10, a mounting screw 408 extends through a mounting opening 412 in second bracket support and screws into a mounting nut (not shown) disposed in a clamping band 416 that encircles seat tube 34. Clamping band 416 includes mounting ears 420 and 424, wherein mounting ear 420 includes a mounting opening 428 which receives a mounting screw 432 therethrough, and mounting ear 424 includes a threaded opening (not shown) that engages mounting screw 432 so that clamping band 416 may be fastened to seat tube 34.

Figure 11:
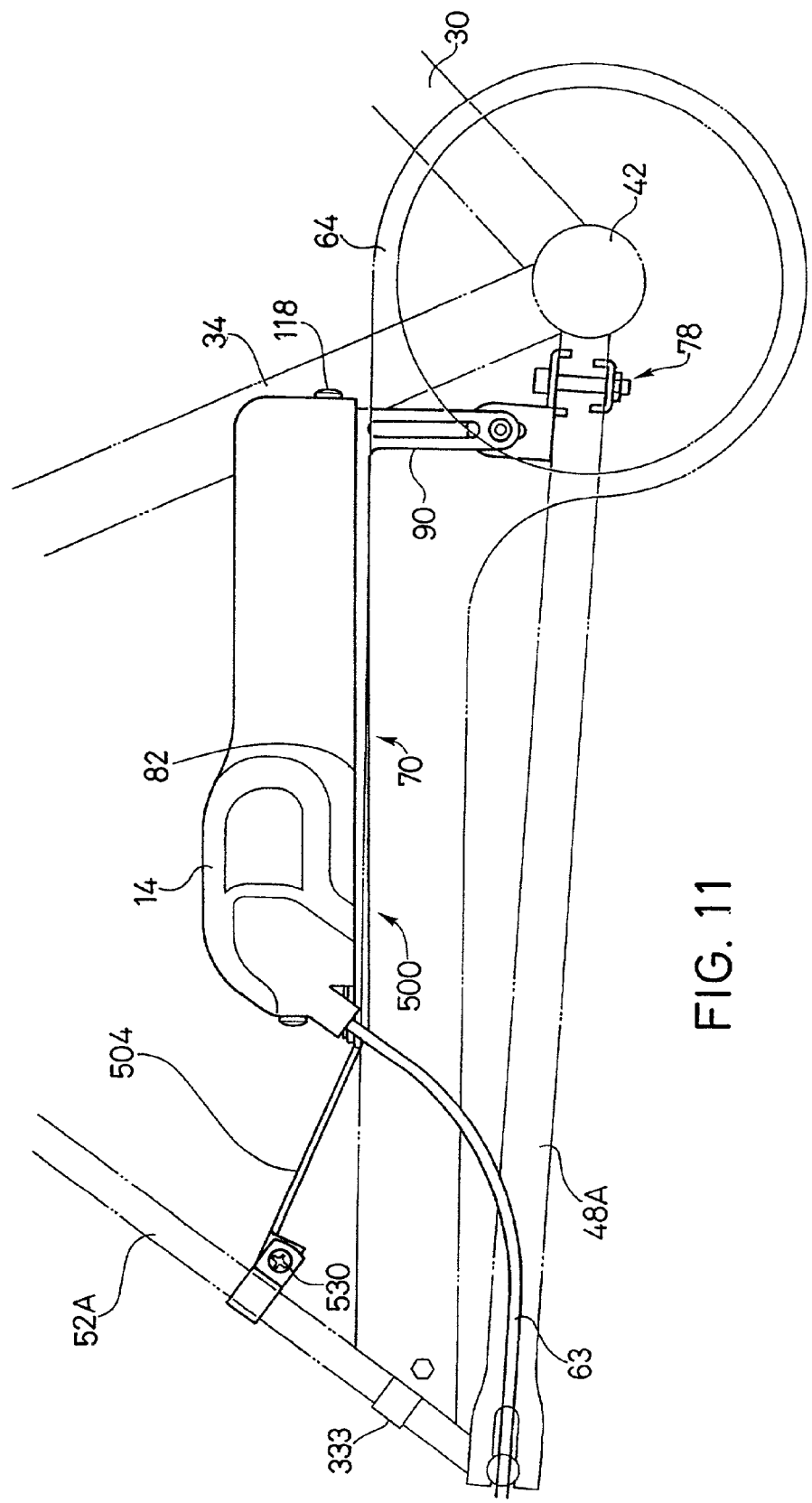
FIG. 11 is a side view of a fourth embodiment of a bracket assembly according to the present invention for mounting a control device such as a motor to the bicycle frame.

FIG. 11 is a side view of a fourth embodiment of a bracket assembly 500 according to the present invention for mounting a control device such as motor 14 to the bicycle frame 18. As with the previous embodiments, this embodiment has many features in common with the first embodiment, so the identical components are numbered the same, and only the differences will be described in detail.

Figure 12:
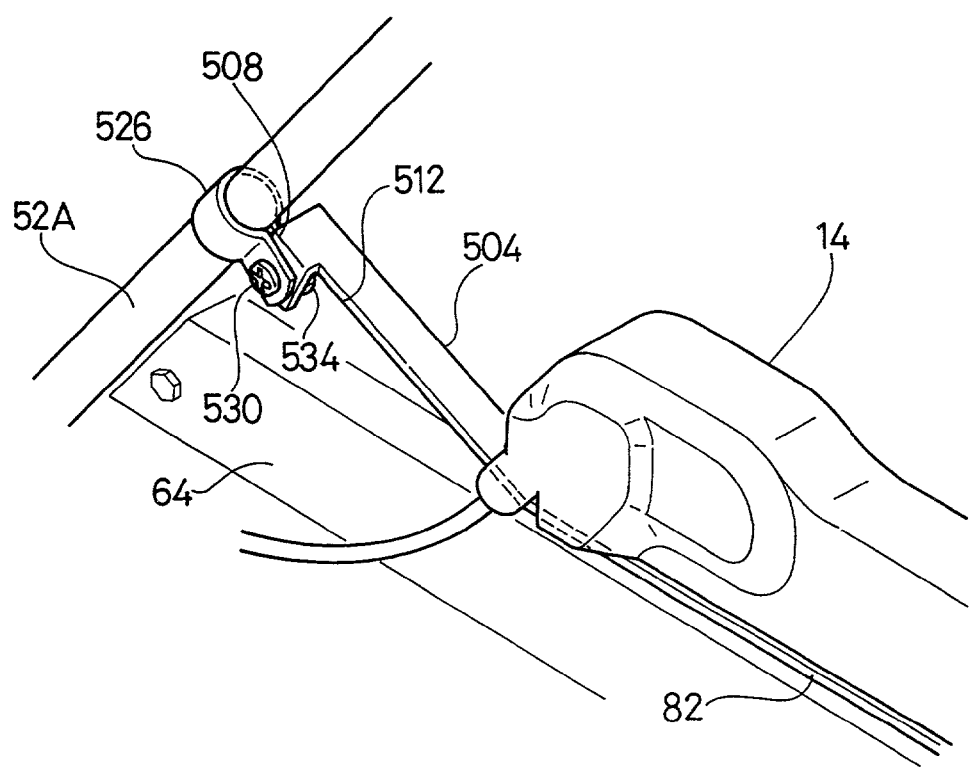
FIG. 12 is a detailed view showing how the bracket assembly is mounted to a seat stay of the bicycle frame.

In this embodiment, second bracket support 90 is adapted to couple bracket base 82 to first and second chain stays 48A and 48B through bracket support bridge 78 in the same manner as in the first embodiment. However, in this embodiment, a first bracket support 504 is adapted to couple bracket base 82 to seat stay 52A. More specifically, as shown in FIGS. 11 and 12, first bracket support 504 extends rearwardly and upwardly in an inclined manner from bracket base 82 and includes a mounting ear 508 that extends downwardly from a lateral side 512 of first bracket support 512. Mounting ear 508 includes a mounting opening (not shown) that aligns with a mounting opening (not shown) in a clamping band 526 that encircles seat stay 52A for receiving a mounting screw 530 therethrough. Mounting screw 530 screws into a mounting nut 534 disposed on the rear side of mounting ear 508 so that clamping band 526 and first bracket support 504 may be fastened to seat tube 52A.

Figure 13:
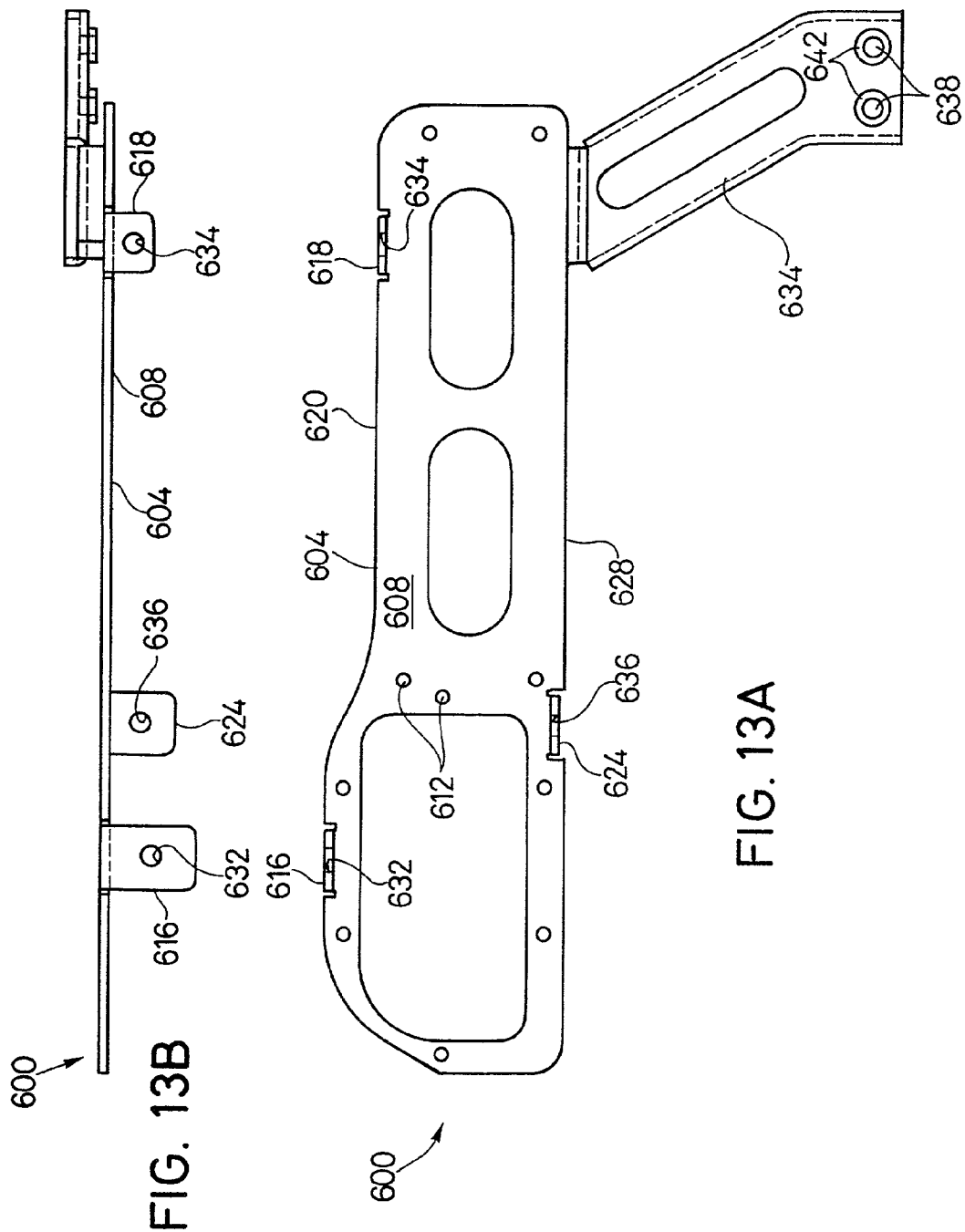
FIGS. 13A and 13B are side and top views of a fifth embodiment of a main bracket according to the present invention for mounting a control device such as a motor to the bicycle frame.

FIGS. 13A and 13B are side and top views of a fifth embodiment of a main bracket 600 according to the present invention for mounting a control device such as a motor 14 to the bicycle frame 18. This embodiment differs from the previous embodiments in that main bracket 600 includes a substantially vertical bracket base 604 with a substantially vertical mounting surface 608 for mounting motor 14 or some other control device to bracket base 604. As in the previous embodiments, mounting structures in the form of mounting holes 612 are disposed on mounting surface 608 for receiving mounting screws (not shown) for securing motor 14 to mounting surface 94. Additionally, bracket base 604 includes braces 616 and 618 extending substantially horizontally (perpendicularly) from an upper edge 620 of bracket base 604 for contacting an upper surface of motor 14, and a brace 624 extending substantially horizontally (perpendicularly) from a lower edge 628 of bracket base 604 for contacting a lower surface of motor 14. Braces 616, 618 and 624 include mounting openings 632, 634 and 636, respectively, for receiving mounting screws (not shown) therethrough for fastening braces 616, 618 and 624 to motor 14 for additional support. Of course, as with the previous embodiments, mounting openings and braces may be added or subtracted as desired, and other mounting structures such as posts, adhesives, etc. may be used instead of or in addition to the mounting structures shown.

Figure 14:
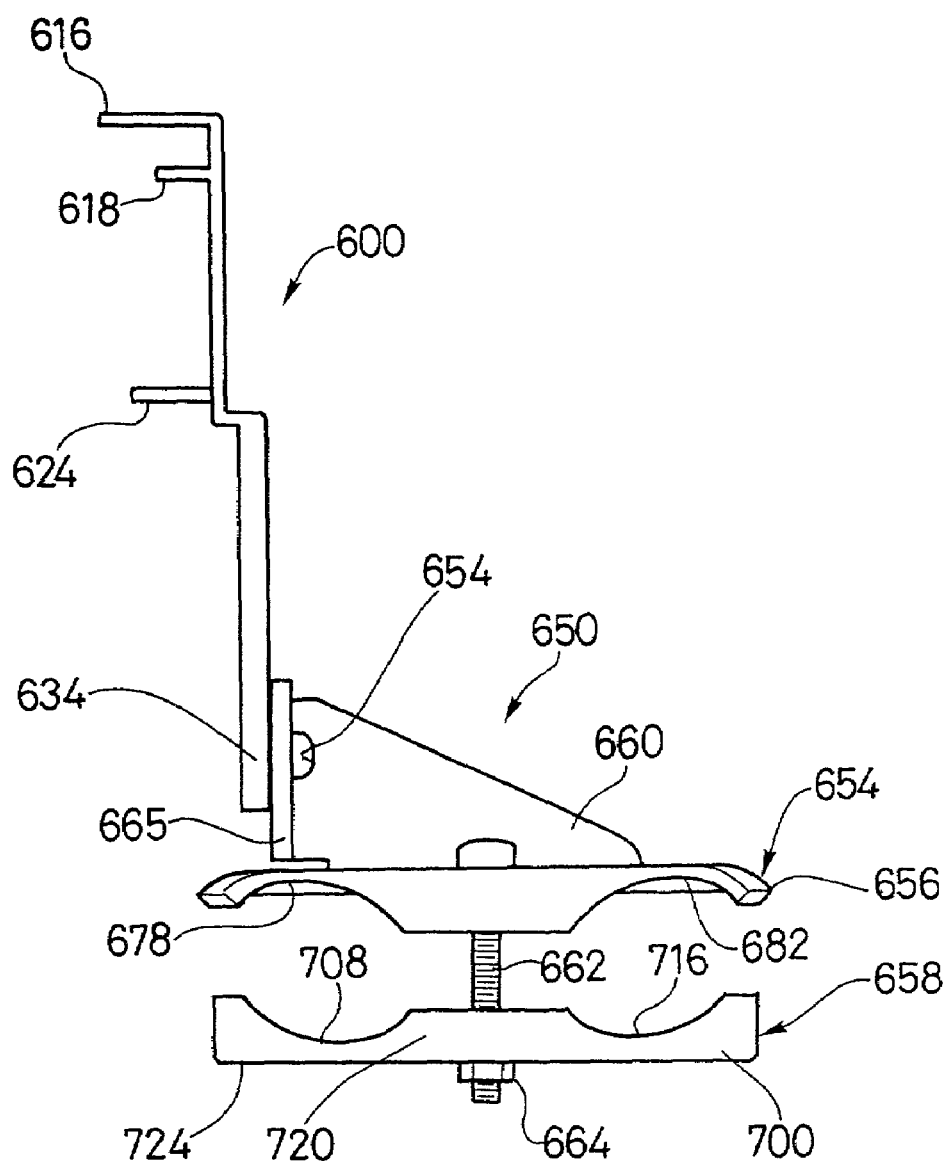
FIG. 14 shows the main bracket of FIGS. 13A and 13B fastened to a bracket support bridge.

Bracket base 604 further includes a bracket support 634 extending downwardly from lower edge 628 at the front of bracket base 604 so as to be laterally offset from a center of the vertical portions of bracket base 604 when viewed from the front of bracket base 604 as shown in FIG. 14. Bracket support 634 includes a pair of mounting openings 638, each having a threaded inner peripheral surface 642. As shown in FIG. 14, a bracket support bridge 650 is mounted to the lower end of bracket support 634 through a pair mounting screws 654, wherein each mounting screw 654 screws into one of the threaded mounting openings 638. As in the first embodiment, bracket support bridge 650 includes an upper clamping flange 654, a lower clamping flange 658, a clamping bolt 662 and a clamping nut 664.

Figure 15A:
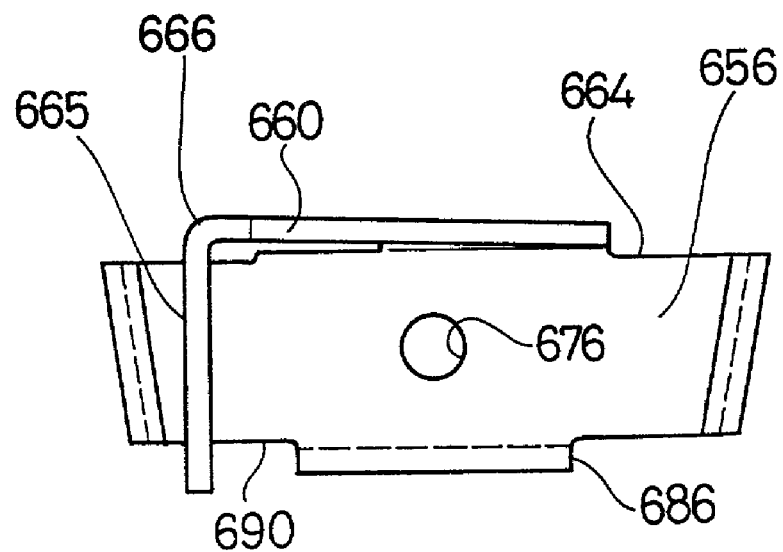
FIGS. 15A and 15B are top and side views of the upper clamping flange of the bracket support bridge shown in FIG. 14.
Figure 15B:
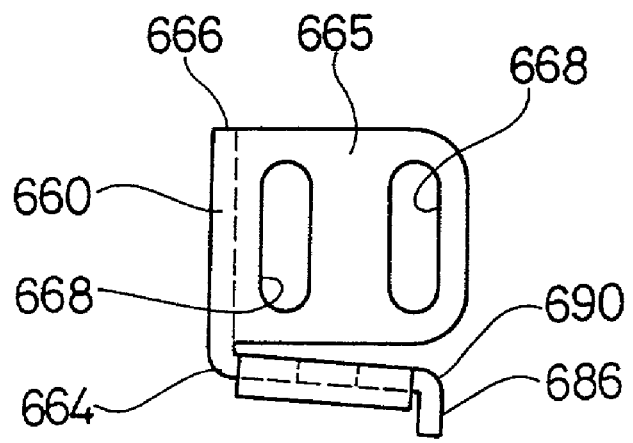

FIGS. 15A and 15B are top and side views of upper clamping flange 654. Upper clamping flange 654 includes a generally horizontal clamping plate 656, a bracket support mounting wall 660 extending vertically upwardly and substantially perpendicularly to a rear edge 664 of clamping plate 656, and a bracket support ear 665 extending forwardly and substantially perpendicularly to a side edge 666 of bracket support mounting wall 660 such that bracket support mounting wall 660, clamping plate 656 and bracket support ear 665 are substantially orthogonal to each other. Bracket support mounting wall 660 helps avoid unwanted bending of clamping plate 656 when clamping bolt 662 is tightened. Bracket support ear 665 has a pair of vertically elongated mounting holes 668 for receiving mounting screws 654 therethrough in a manner that allows the vertical position of main bracket 600 to be adjusted. Clamping plate 656 includes a mounting opening 676 for receiving clamping bolt 662 therethrough, an arcuate chain stay clamping surface 678 for contacting chain stay 48A, an arcuate chain stay clamping surface 682 for contacting chain stay 48B, and a front reinforcing rib 686 extending generally perpendicularly downwardly from a front edge 690.

As shown in FIG. 14, lower clamping flange 658 includes a generally horizontal clamping plate 700, wherein clamping plate 700 includes a mounting opening (not shown) for receiving clamping bolt 668 therethrough, an arcuate chain stay clamping surface 708 for contacting chain stay 48A, an arcuate chain stay clamping surface 716 for contacting chain stay 48B, and a front reinforcing rib 720 extending generally perpendicularly upwardly from a front edge 724.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A bracket apparatus for mounting a separate self-contained control device for a bicycle transmission to a bicycle frame, wherein the frame has a bottom bracket shell, a seat tube extending upwardly relative to the bottom bracket shell, a first chain stay extending rearwardly relative to the seat tube and a first seat stay extending rearwardly relative to the seat tube above the first chain stay, wherein the apparatus comprises:
   - a bracket base dimensioned for supporting the control device at least partially above the first chain stay and at least partially below the first seat stay such that the control device can be removed as a unit from the bracket base;
   - wherein the bracket base has a substantially horizontal upper surface for substantially its entire length, wherein the upper surface is structured to receive a vertically downwardly directed force component from a portion of the control device mounted above it;
   - a first bracket support for coupling the bracket base to at least one of the first chain stay and the first seat stay; and
   - a second bracket support for coupling the bracket base to at least one of the first chain stay, the seat tube, and the bottom bracket shell.

2. The apparatus according to claim 1 wherein the first bracket support is adapted to couple the bracket base to the first chain stay, and wherein the second bracket support is adapted to couple the bracket base to the first chain stay.

3. The apparatus according to claim 2 wherein at least one of the first bracket support and the second bracket support is laterally offset from a center of the bracket base when viewed from a front of the bracket base.

4. The apparatus according to claim 3 wherein the first bracket support and the second bracket support are laterally offset from a center of the bracket base when viewed from a front of the bracket base.

5. The apparatus according to claim 2 wherein at least one of the first bracket support and the second bracket support extends downwardly from a lateral side of the bracket base when viewed from a front of the bracket base.

6. The apparatus according to claim 5 wherein the first bracket support and the second bracket support extend downwardly from a lateral side of the bracket base when viewed from a front of the bracket base.

7. The apparatus according to claim 2 wherein the bracket base includes a mounting structure disposed on an upper surface thereof for mounting the control device above the bracket base.

8. The apparatus according to claim 7 wherein the bracket base includes a mounting hole on the upper surface thereof for forming the mounting structure.

9. The apparatus according to claim 2 wherein the bracket base includes a mounting flange extending upwardly from an upper surface thereof for mounting the control device to the bracket base.

10. The apparatus according to claim 9 wherein the mounting flange is disposed at a front of the bracket base.

11. The apparatus according to claim 2 wherein at least one of the first bracket support and the second bracket support is disposed at a front of the bracket base.

12. The apparatus according to claim 11 wherein the first bracket support is disposed behind the second bracket support, and wherein the second bracket support is disposed at a front of the bracket base.

13. The apparatus according to claim 2 wherein the first bracket support includes a first mounting opening, and wherein the second bracket support includes a second mounting opening.

14. The apparatus according to claim 13 wherein the second mounting opening has a threaded inner peripheral surface.

15. The apparatus according to claim 2 wherein an upper surface of the bracket base is substantially flat along substantially its entire length.

16. The apparatus according to claim 2 wherein at least a portion of the first bracket support extends substantially parallel to the second bracket support.

17. A bracket apparatus for mounting a control device for a bicycle transmission to a bicycle frame, wherein the frame has a bottom bracket shell, a seat tube extending upwardly relative to the bottom bracket shell, a first chain stay extending rearwardly relative to the seat tube and a first seat stay extending rearwardly relative to the seat tube above the first chain stay, wherein the apparatus comprises:
   - a bracket base for supporting the control device at least partially above the first chain stay;
   - a first bracket support for coupling the bracket base to at least one of the first chain stay and the first seat stay;
   - a second bracket support for coupling the bracket base to the first chain stay; and
   - wherein the bicycle frame has a second chain stay extending rearwardly relative to the seat tube, and further comprising a bracket support bridge adapted to bridge the first chain stay and the second chain stay for coupling the second bracket support to the first chain stay and to the second chain stay.

18. The apparatus according to claim 17 further comprising a clamping band for coupling the first bracket support to the first chain stay.

19. The apparatus according to claim 1 wherein the first bracket support is adapted to couple the bracket base to the first chain stay, and wherein the second bracket support is adapted to couple the bracket base to the bottom bracket shell.

20. The apparatus according to claim 19 wherein the second bracket support includes an opening for aligning with an opening in the bottom bracket shell.

21. The apparatus according to claim 20 wherein the second bracket support includes a chain case mounting structure for mounting a chain case thereto.

22. The apparatus according to claim 20 further comprising a clamping band for coupling the first bracket support to the first chain stay.

23. The apparatus according to claim 19 wherein at least one of the first bracket support and the second bracket support is laterally offset from a center of the bracket base when viewed from a front of the bracket base.

24. The apparatus according to claim 23 wherein the first bracket support and the second bracket support are laterally offset from a center of the bracket base when viewed from a front of the bracket base.

25. The apparatus according to claim 19 wherein at least one of the first bracket support and the second bracket support extends downwardly from a lateral side of the bracket base when viewed from a front of the bracket base.

26. The apparatus according to claim 25 wherein the first bracket support and the second bracket support extend downwardly from a lateral side of the bracket base when viewed from a front of the bracket base.

27. The apparatus according to claim 19 wherein the bracket base includes a mounting structure disposed on an upper surface thereof for mounting the control device above the bracket base.

28. The apparatus according to claim 27 wherein the bracket base includes a mounting hole on the upper surface thereof for forming the mounting structure.

29. The apparatus according to claim 19 wherein the bracket base includes a mounting flange extending upwardly from an upper surface thereof for mounting the control device to the bracket base.

30. The apparatus according to claim 29 wherein the mounting flange is disposed at a front of the bracket base.

31. The apparatus according to claim 19 wherein at least one of the first bracket support and the second bracket support is disposed at a front of the bracket base.

32. The apparatus according to claim 31 wherein the first bracket support is disposed behind the second bracket support, and wherein the second bracket support is disposed at a front of the bracket base.

33. The apparatus according to claim 19 wherein the first bracket support includes a first mounting opening, and wherein the second bracket support includes a second mounting opening.

34. The apparatus according to claim 19 wherein an upper surface of the bracket base is substantially flat along substantially its entire length.

35. The apparatus according to claim 19 wherein at least a portion of the second bracket support extends substantially parallel to the first bracket support.

36. The apparatus according to claim 1 wherein the first bracket support is adapted to couple the bracket base to the first chain stay, and wherein the second bracket support is adapted to couple the bracket base to the seat tube.

37. The apparatus according to claim 36 wherein at least one of the first bracket support and the second bracket support is laterally offset from a center of the bracket base when viewed from a front of the bracket base.

38. The apparatus according to claim 37 wherein the first bracket support and the second bracket support are laterally offset from a center of the bracket base when viewed from a front of the bracket base.

39. The apparatus according to claim 36 wherein at least one of the first bracket support and the second bracket support extends downwardly from a lateral side of the bracket base when viewed from a front of the bracket base.

40. The apparatus according to claim 39 wherein the first bracket support and the second bracket support extend downwardly from a lateral side of the bracket base when viewed from a front of the bracket base.

41. The apparatus according to claim 36 wherein the bracket base includes a mounting structure disposed on an upper surface thereof for mounting the control device above the bracket base.

42. The apparatus according to claim 41 wherein the bracket base includes a mounting hole on the upper surface thereof for forming the mounting structure.

43. The apparatus according to claim 36 wherein the bracket base includes a mounting flange extending upwardly from an upper surface thereof for mounting the control device to the bracket base.

44. The apparatus according to claim 43 wherein the mounting flange is disposed at a front of the bracket base.

45. The apparatus according to claim 36 wherein at least one of the first bracket support and the second bracket support is disposed at a front of the bracket base.

46. The apparatus according to claim 45 wherein the first bracket support is disposed behind the second bracket support, and wherein the second bracket support is disposed at a front of the bracket base.

47. The apparatus according to claim 36 wherein the first bracket support includes a first mounting opening, and wherein the second bracket support includes a second mounting opening.

48. The apparatus according to claim 36 wherein an upper surface of the bracket base is substantially flat along substantially its entire length.

49. The apparatus according to claim 36 further comprising a first clamping band for coupling the first bracket support to the first chain stay.

50. The apparatus according to claim 49 further comprising a second clamping band for coupling the second bracket support to the seat tube.

51. The apparatus according to claim 36 further comprising a clamping band for coupling the second bracket support to the seat tube.

52. The apparatus according to claim 1 wherein the first bracket support is adapted to couple the bracket base to the first seat stay, and wherein the second bracket support is adapted to couple the bracket base to the first chain stay.

53. The apparatus according to claim 52 wherein at least one of the first bracket support and the second bracket support is laterally offset from a center of the bracket base when viewed from a front of the bracket base.

54. The apparatus according to claim 52 wherein the second bracket support extends downwardly from a lateral side of the bracket base when viewed from a front of the bracket base.

55. The apparatus according to claim 54 wherein the first bracket support extends rearwardly from the bracket base.

56. The apparatus according to claim 52 wherein the bracket base includes a mounting structure disposed on an upper surface thereof for mounting the control device above the bracket base.

57. The apparatus according to claim 56 wherein the bracket base includes a mounting hole on the upper surface thereof for forming the mounting structure.

58. The apparatus according to claim 52 wherein the bracket base includes a mounting flange extending upwardly from an upper surface thereof for mounting the control device to the bracket base.

59. The apparatus according to claim 58 wherein the mounting flange is disposed at a front of the bracket base.

60. The apparatus according to claim 52 wherein the second bracket support is disposed at a front of the bracket base.

61. The apparatus according to claim 60 wherein the first bracket support is disposed behind the second bracket support and extends rearwardly from the bracket base, and wherein the second bracket support is disposed at a front of the bracket base.

62. The apparatus according to claim 52 wherein the first bracket support includes a first mounting opening, and wherein the second bracket support includes a second mounting opening.

63. The apparatus according to claim 52 wherein an upper surface of the bracket base is substantially flat along substantially its entire length.

64. The apparatus according to claim 52 wherein the bicycle frame is of the type having a second chain stay extending rearwardly relative to the seat tube, and further comprising a bracket support bridge adapted to bridge the first chain stay and the second chain stay for coupling the second bracket support to the first chain stay and to the second chain stay.

65. The apparatus according to claim 64 further comprising a clamping band for coupling the first bracket support to the first seat stay.

66. A bracket apparatus for mounting a separate self-contained control device for a bicycle to a bicycle frame, wherein the frame has a bottom bracket shell, a seat tube extending upwardly relative to the bottom bracket shell, a first chain stay extending rearwardly relative to the seat tube and a first seat stay extending rearwardly relative to the seat tube above the first chain stay, wherein the apparatus comprises:
a bracket base dimensioned for supporting the control device at least partially above the first chain stay and at least partially below the first seat stay such that the control device can be removed as a unit from the bracket base;
wherein the bracket base has a substantially horizontal upper surface for substantially its entire length, wherein the upper surface is structured to receive a vertically downwardly directed force component from a portion of the control device mounted above it, and wherein the upper surface does not form a part of the control device; and
a bracket support extending from the bracket base for coupling the bracket base to at least one of the first chain stay, the first seat stay, the seat tube, and the bottom bracket shell.

67. The apparatus according to claim 66 wherein the bracket base has a substantially horizontal mounting surface for mounting the control device to the bracket base.

68. A bracket apparatus for mounting a control device for a bicycle to a bicycle frame, wherein the frame has a bottom bracket shell, a seat tube extending upwardly relative to the bottom bracket shell, a first chain stay extending rearwardly relative to the seat tube and a first seat stay extending rearwardly relative to the seat tube above the first chain stay, wherein the apparatus comprises:
a bracket base for supporting the control device at least partially above the first chain stay;
wherein the bracket base has a substantially horizontal mounting surface for mounting the control device to the bracket base;
a bracket support extending from the bracket base for coupling the bracket base to the first chain stay; and
wherein the bicycle frame has a second chain stay extending rearwardly relative to the seat tube, and further comprising a bracket support bridge adapted to bridge the first chain stay and the second chain stay for coupling the bracket support to the first chain stay and to the second chain stay.

69. The apparatus according to claim 66 wherein the bracket base has a substantially vertical mounting surface for mounting the control device to the bracket base.

70. A bracket apparatus for mounting a control device for a bicycle to a bicycle frame, wherein the frame has a bottom bracket shell, a seat tube extending upwardly relative to the bottom bracket shell, a first chain stay extending rearwardly relative to the seat tube and a first seat stay extending rearwardly relative to the seat tube above the first chain stay, wherein the apparatus comprises:
a bracket base for supporting the control device at least partially above the first chain stay;
wherein the bracket base has a substantially vertical mounting surface for mounting the control device to the bracket base;
a bracket support extending from the bracket base for coupling the bracket base to the first chain stay; and
wherein the bicycle frame has a second chain stay extending rearwardly relative to the seat tube, and further comprising a bracket support bridge adapted to bridge the first chain stay and to the second chain stay for coupling the bracket support to the first chain stay and to the second chain stay.

71. The apparatus according to claim 70 wherein the bracket support bridge includes:
a bracket support mounting wall for mounting the bracket support bridge to the bracket support; and
a clamping member for mounting the bracket support bridge to the first chain stay and to the second chain stay.

72. The apparatus according to claim 71 wherein the clamping member is substantially horizontal, and wherein the bracket support mounting wall extends upwardly from the clamping member.

73. The apparatus according to claim 72 wherein the bracket support mounting wall includes an elongated opening for adjusting a vertical position of the bracket support bridge relative to the bracket support.

74. The apparatus according to claim 72 further comprising a bracket support ear extending from the bracket support mounting wall.

75. The apparatus according to claim 74 wherein the bracket support mounting wall, the clamping member and the bracket support ear are substantially orthogonal to each other.

76. The apparatus according to claim 69 further comprising a brace extending substantially horizontally from the bracket base for mounting the control device to the bracket base.

77. The apparatus according to claim 66 wherein the bracket support extends downwardly from the bracket base.

78. A bracket apparatus for mounting a separate self-contained control device for a bicycle transmission to a bicycle frame, wherein the frame has a bottom bracket shell, a seat tube extending upwardly relative to the bottom bracket shell, a first chain stay extending rearwardly relative to the seat tube and a first seat stay extending rearwardly relative to the seat tube above the first chain stay, wherein the apparatus comprises:
  a bracket base dimensioned for supporting the control device at least partially above the first chain stay and at least partially below the first seat stay such that the control device can be removed as a unit from the bracket base;
  a first bracket support for coupling the bracket base to at least one of the first chain stay and the first seat stay;
  a second bracket support for coupling the bracket base to at least one of the first chain stay, the seat tube, and the bottom bracket shell; and
  wherein the bracket base has an upper surface that extends laterally in a horizontal direction beyond the first bracket support and the second bracket support.

79. A bracket apparatus for mounting a separate self-contained control device for a bicycle transmission to a bicycle frame, wherein the frame has a bottom bracket shell, a seat tube extending upwardly relative to the bottom bracket shell, a first chain stay extending rearwardly relative to the seat tube and a first seat stay extending rearwardly relative to the seat tube above the first chain stay, wherein the apparatus comprises:
  a bracket base dimensioned for supporting the control device at least partially above the first chain stay and at least partially below the first seat stay such that the control device can be removed as a unit from the bracket base;
  wherein the bracket base includes a mounting surface extending vertically upwardly from an upper surface thereof, wherein the upper surface is structured to receive a vertically downwardly directed force component from a portion of the control device mounted above it;
  a first bracket support for coupling the bracket base to at least one of the first chain stay and the first seat stay; and
  a second bracket support for coupling the bracket base to at least one of the first chain stay, the seat tube, and the bottom bracket shell.

80. A bracket apparatus for mounting a separate self-contained control device for a bicycle transmission to a bicycle frame, wherein the frame has a bottom bracket shell, a seat tube extending upwardly relative to the bottom bracket shell, a first chain stay extending rearwardly relative to the seat tube and a first seat stay extending rearwardly relative to the seat tube above the first chain stay, wherein the apparatus comprises:
  a bracket base dimensioned for supporting the control device at least partially above the first chain stay and at least partially below the first seat stay such that the control device can be removed as a unit from the bracket base;
  wherein the bracket base has an upper surface that is structured to receive a vertically downwardly directed force component from a portion of the control device mounted above it;
  a first bracket support for coupling the bracket base to at least one of the first chain stay and the first seat stay; and
  a second bracket support for coupling the bracket base to at least one of the first chain stay, the seat tube, and the bottom bracket shell.

81. The apparatus according to claim 80 wherein the upper surface is substantially horizontal from the first bracket support to the second bracket support.

82. A bracket apparatus for mounting a separate self-contained motor that controls a bicycle transmission to a bicycle frame, wherein the frame has a bottom bracket shell, a seat tube extending upwardly relative to the bottom bracket shell, a first chain stay extending rearwardly relative to the seat tube and a first seat stay extending rearwardly relative to the seat tube above the first chain stay, wherein the apparatus comprises:
  a bracket base dimensioned for supporting the motor at least partially above the first chain stay and at least partially below the first seat stay such that the motor can be removed as a unit from the bracket base;
  wherein the bracket base has an upper surface that supports the motor so as to receive a vertically downwardly directed force component from a portion of the motor mounted above it;
  a first bracket support for coupling the bracket base to at least one of the first chain stay and the first seat stay; and
  a second bracket support for coupling the bracket base to at least one of the first chain stay, the seat tube, and the bottom bracket shell.

* * * * *